Patented Mar. 10, 1925.

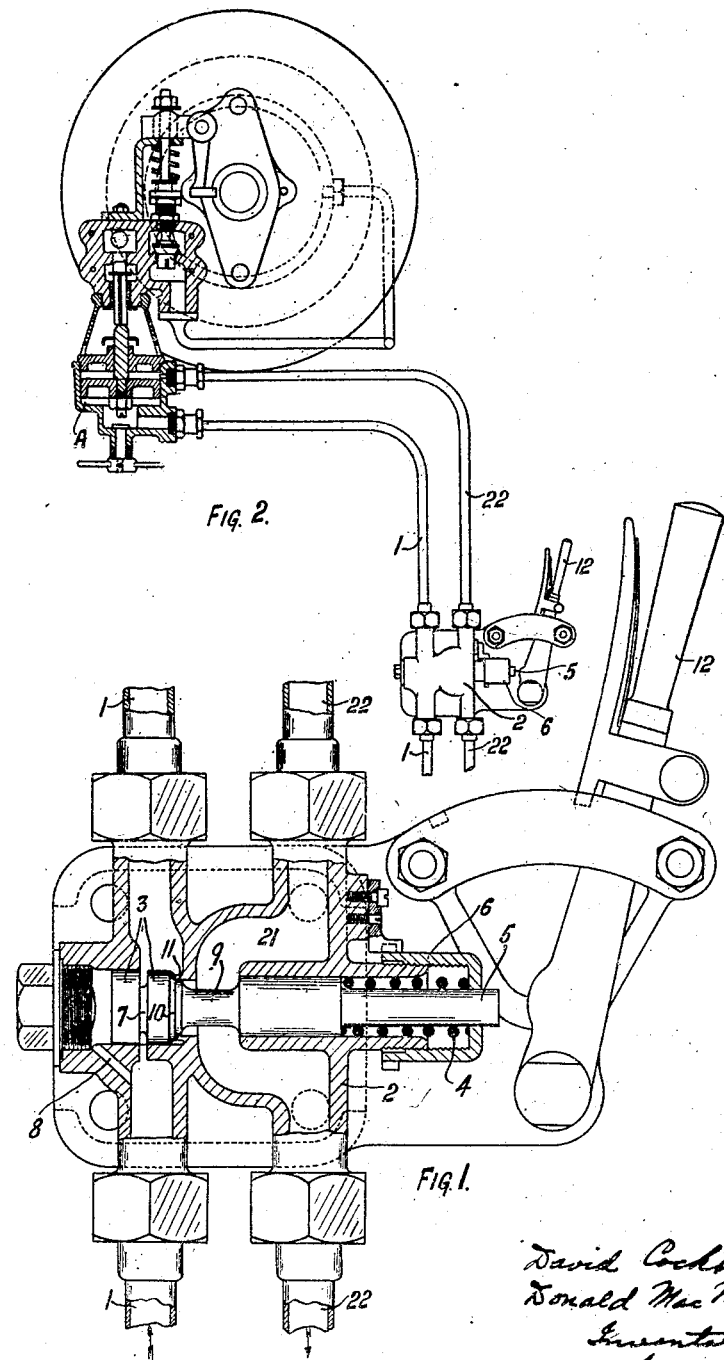

1,529,169

UNITED STATES PATENT OFFICE.

DAVID COCKBURN AND DONALD MacNICOLL, OF CARDONALD, NEAR GLASGOW, SCOTLAND, ASSIGNORS TO COCKBURN'S LIMITED, OF CARDONALD, NEAR GLASGOW, SCOTLAND.

ENGINE STOP GEAR.

Application filed May 25, 1923. Serial No. 641,351.

*To all whom it may concern:*

Be it known that we, DAVID COCKBURN and DONALD MacNICOLL, subjects of the King of the United Kingdom of Great Britain and Ireland, and residing at Cardonald, near Glasgow, Scotland, have invented a certain new and useful Improvement in Engine Stop Gears, of which the following is a specification.

This invention relates to engine stop gear of that type comprising a relay dependent for operation on the supply to one side thereof of oil which may be taken from the engine lubrication system and arranged to effect the operation of a relay valve and thereby of a cut off valve or the like, as disclosed for example in the specification of Letters Patent of the United States No. 1,401,239.

The invention has for its object to provide a construction for effecting the rapid operation of the relay valve at any predetermined pressure of oil automatically or manually.

Figure 1 of the accompanying drawing is a vertical section illustrating a construction embodying the invention.

Figure 2 illustrates the adaptation of the construction to the arrangement disclosed in the Letters Patent above mentioned.

As shown, there is interposed in the oil connection 1 (which leads from the supply to a relay A, controlling the valve of an engine stop gear) a valve casing 2 in which is movable a piston valve 3 continuously urged in the direction to close the connection by a spring 4 interposed between a shoulder on the piston valve stem 5 and a cap 6 threaded on the casing 2 and manually adjustable in dependence on the pressure selected.

The piston valve 3 is formed with an annular passage 7 which in the open position of the piston valve permits the passage of oil past the valve 3 to the relay.

From the supply side of the oil connection 1 a port 8 leads to the end of the piston valve 3. With normal conditions the pressure of oil acting on the end of the piston valve is sufficient to overcome the spring 4 so that the piston valve 3 remains open, that is in the position shown.

On failure of pressure or failure of oil the spring 4 acts automatically to close the piston valve so that the passage 7 is masked and oil can no longer pass to the relay.

The piston valve is also formed with a part 9 of reduced cross-section, which, when the piston valve has been moved to closed position, comes into register with the upper side of the connection 1 so that oil can then quickly escape past said part of reduced cross-section, thus permitting rapid operation of the relay valve.

The part 9 of reduced cross-section is connected to the main body of the piston valve 3 by a coned portion 10 which in the open position of the piston valve seats on an internal lip 11 on the valve casing 2, but clears the lip 11 when the piston valve is moved to closed position.

The lip 11 forms a valve seat around a by-pass opening between the oil connection 1 and the chamber 21 in the oil connection 22 for return of oil from the relay. When the piston 3 moves to the left clear of the lip, oil in the connection 1 can flow through the by-pass opening into the chamber 21 and escape through the connection 22.

The piston valve stem 5 protrudes through the cap 6 and may also be moved axially by operation of a hand lever 12.

What we claim is:—

In an engine stop gear of the type referred to, the combination of a relay for controlling said gear, a control pipe for conveying oil to said relay to actuate the same, an oil supply pipe, an oil discharge pipe, and a valve casing connected to said pipes and having a piston valve therein for controlling the flow of oil from the supply pipe to said control pipe, said valve being normally exposed to oil pressure from the supply tank thus maintaining the valve in open position to permit the flow of oil to the relay, a spring coacting with said piston valve for opposing said oil pressure and operating to return the valve to closed position upon the failure of said oil pressure, and a second valve member on said piston valve adapted to be opened simultaneously with the closing of the piston valve to connect said control pipe with said discharge pipe and immediately reduce the pressure in the control pipe so as to actuate the relay.

In testimony whereof we have signed our names to this specification in the presence of two subscribing witnesses.

DAVID COCKBURN.
DONALD MacNICOLL.

Witnesses:
 ISABEL ROLLO,
 ANNE R. WATT.